United States Patent Office 3,387,378
Patented June 11, 1968

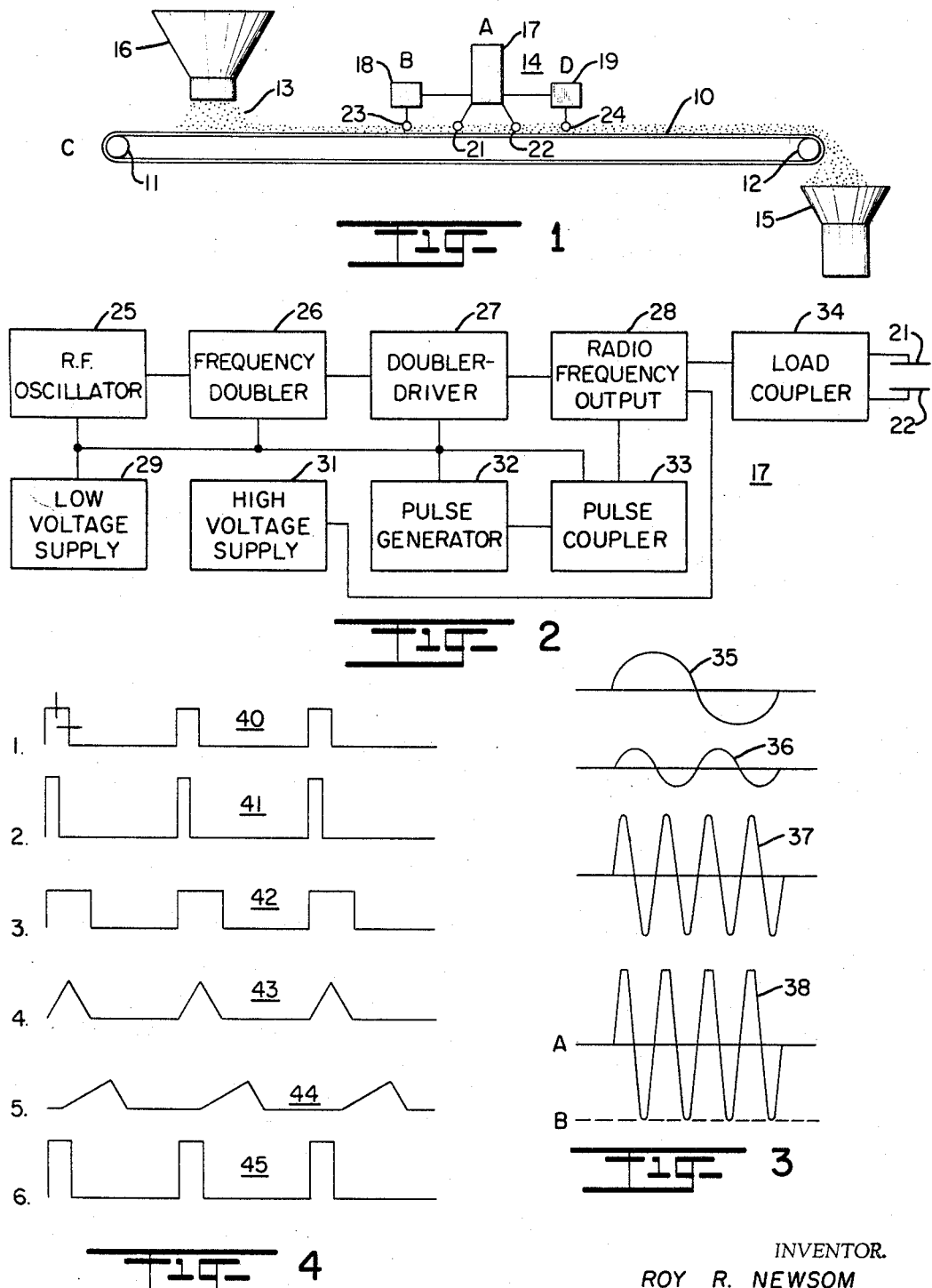

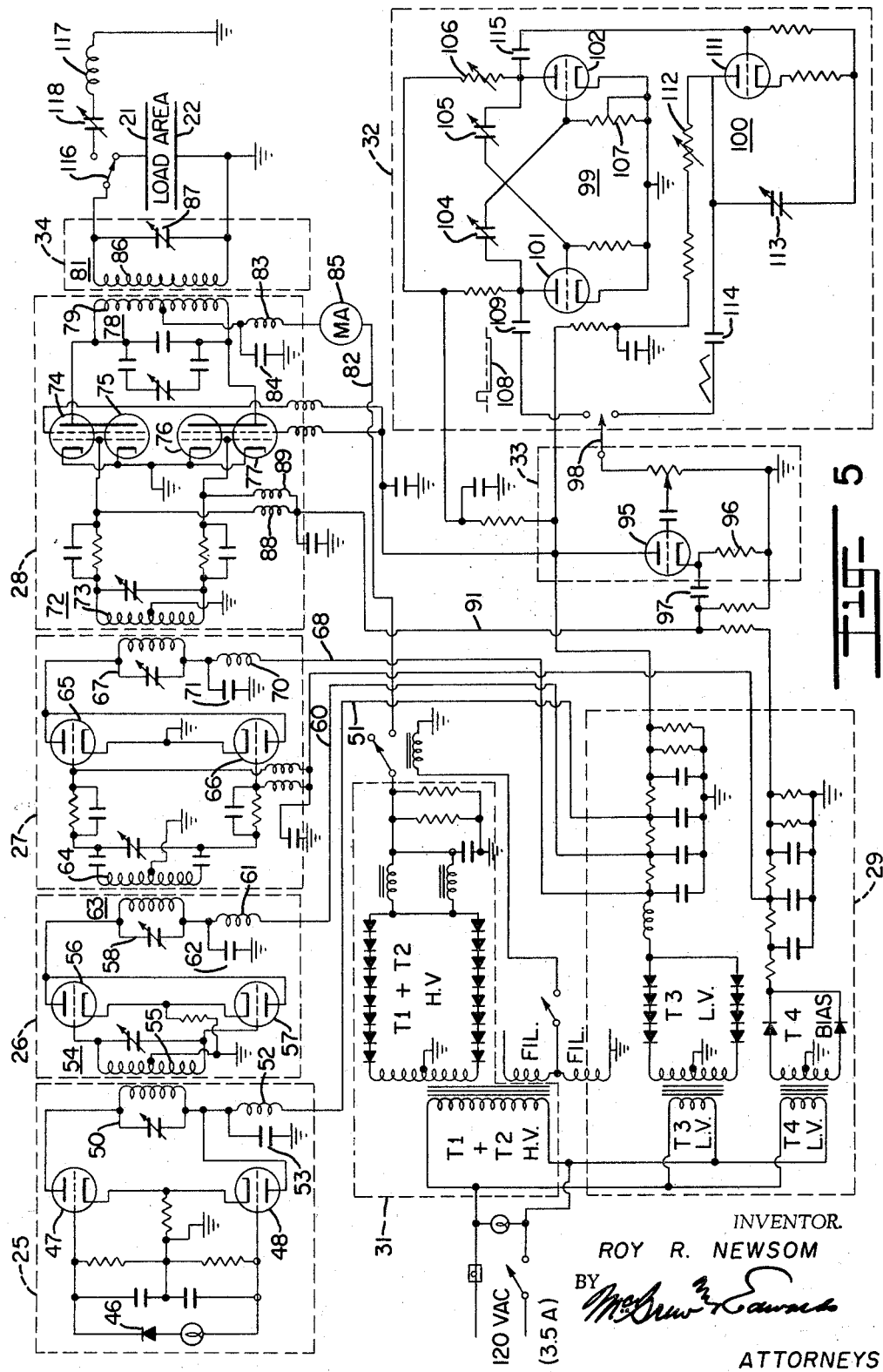

3,387,378
METHOD AND APPARATUS FOR HIGH FREQUENCY TREATMENT OF MATERIALS
Roy R. Newsom, Escondido, Calif., assignor to Control Systems Corporation, a corporation of Colorado
Filed July 2, 1965, Ser. No. 469,265
12 Claims. (Cl. 34—1)

ABSTRACT OF THE DISCLOSURE

A high frequency apparatus produces pulsed fields of energy for drying or otherwise treating materials and effects economic use of power in such treatment. The apparatus applies energy at different frequencies and directed into the material along different axes. The application of pulsed energy to material in different successive directions and different rates of application of energy is employed in the control of chemical actions and processes.

---

Figure 6:
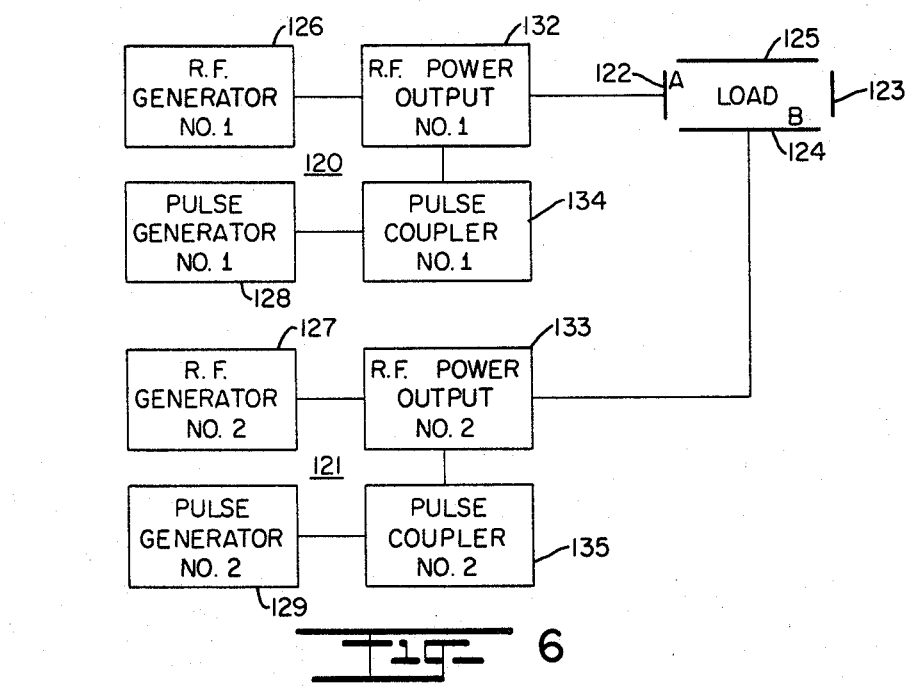

This invention relates to high frequency treatment of matter and particularly to an improved apparatus and method for effectively controlling the rate and intensity of the treatment of a substance by high frequency energy to heat the substance or otherwise affect the molecules thereof.

High frequency energy has found many applications in industry for the purpose of heating. For example, alternating magnetic fields have been employed for the induction heating of metals and high frequency electrostatic fields have been employed in the so-called dielectric heating processes for drying various materials. The methods and apparatus designed for these uses of electromagnetic and electrostatic fields have proved useful and effective. It has been found, however, that the power requirements are excessive for many applications where the processes might be employed and in other applications the effective operation and control of the process has been found difficult or unsatisfactory. Accordingly it is an object of the present invention to provide an improved method for effectively utilizing high frequency energy in the treatment of matter.

It is another object of this invention to provide an improved apparatus for treating substances by the application of high frequency energy.

It is another object of this invention to provide an improved apparatus for treating substances by the application of high frequency energy and for accurately controlling the rate and intensity of application of the energy.

It is a further object of this invention to provide an apparatus for treating substances by the application of high frequency energy including an improved arrangement for facilitating the treatment of a substance by control of the rate, intensity and direction of a high frequency field.

Briefly, in carrying out the objects of this invention, in one embodiment thereof, a high frequency electrostatic field is produced which comprises a continuous series of bursts of high frequency energy and which effects heating of a material under treatment due to the dielectric losses therein. The spacing of the bursts and the magnitude and duration of each burst are selected to apply the energy to a substance in the field at a controlled rate. The intermittent application of relatively small bursts of energy produces effective heating of the substance while conserving energy and also facilitates the precise control of the rate of heating. Apparatus embodying this method is effective, for example, in the drying of substances undergoing treatment in industrial processes. In another embodiment of the invention high frequency fields are applied to the substance under treatment in a predetermined pattern and along different axes or planes; this arrangement provides a method of control which makes it possible for an operator to effect vibration of the molecules of a substance in successive different directions and also at different frequencies and rates of application of energy. This embodiment has application in the motivation and control of chemical actions and processes.

Figure 7:
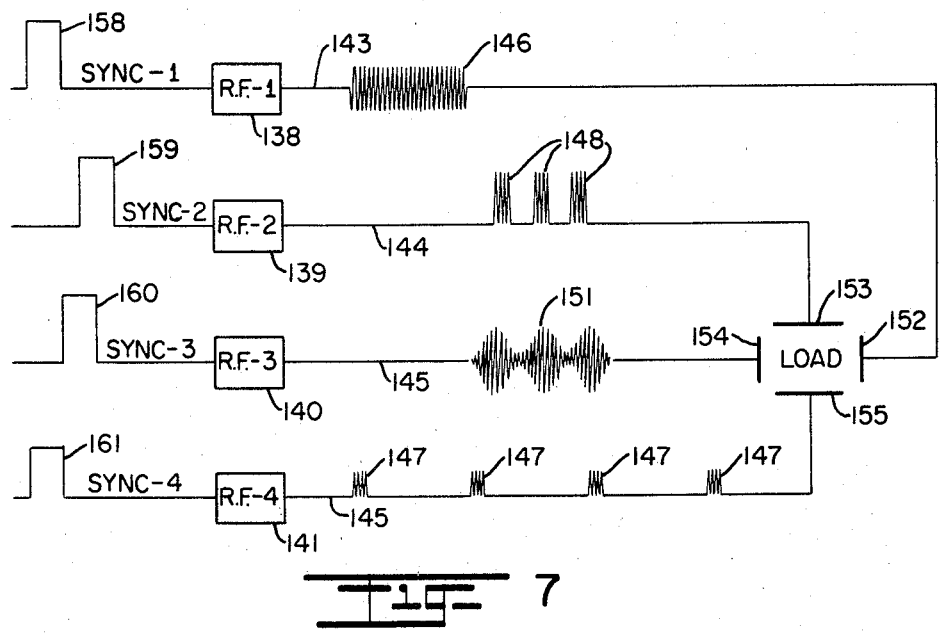

The features of novelty which characterize this invention are pointed out with particularity in the claims annexed to and forming a part of this specification. The invention itself, however, both as to its organization and method of operation, together with further objects and advantages thereof, will be better understood from the following description taken in connection with the accompanying drawings, in which:

FIG. 1 is a diagrammatic view of a material drying apparatus;
FIG. 2 is a block diagram of the electronic circuits of the apparatus of FIG. 1;
FIG. 3 is a graph illustrating operating characteristics of the circuits of FIG. 2;
FIG. 4 is a graph illustrating additional characteristics of the circuits;
FIG. 5 is a schematic circuit diagram of the system shown in the block diagram of FIG. 2;
FIG. 6 is a block diagram of the electronic circuits of another embodiment of the invention; and
FIG. 7 is a partial block diagram of another embodiment of the invention.

Referring now to the drawings, the apparatus shown in FIG. 1 comprises a belt conveyor 10 arranged on rollers 11 and 12 to convey pulverized or granular non-metallic material, such as ore or grain, indicated at 13 into the field of a treating apparatus 14 and thence to deliver the material to a hopper 15 at the right end of the conveyor. The material 13 is supplied to the upper side of the belt through a supply and distributing hopper 16 and is preferably distributed substantially uniformly over the top area of the belt.

The treating apparatus 14, which may be employed, for example, to remove moisture from the material to secure a predetermined dryness thereof, comprises a high frequency electric wave energy generating apparatus 17 and condition sensing devices 18 and 19. The apparatus 17 is provided with electrodes 21 and 22 which extend across the width of the belt and are spaced from one another so that a quantity of the material on the belt lies between the two electrodes which produce a high frequency electrostatic field and effect dielectric heating of the material.

The devices 18 and 19 are provided to facilitate the accurate control of the apparatus and delivery of the material to the hopper 15 with substantially uniform dryness. The device 18 is provided with a sensing element 23 which may, for example, be moisture sensitive and extends into the material to provide an indication of the average amount of moisture in the substance on the conveyor belt. The intensity and duration of the pulses of the field between the electrodes 21 and 22 is controlled in response to the moisture determination made by the apparatus 18. The field between the electrodes being an intermittent or pulsed field is such that the material is subjected to slugs or bursts of energy, and in controlling the total energy of the field both the intensity and duration of the bursts may be adjusted and also the intervals between the bursts. By employing bursts of energy in this manner a high intensity field may be provided while at the same time energy is conserved by the intermittent occurrence of the energy bursts.

In addition to the control device 18, the device 19 may be provided to sense the condition of the material after its treatment by the apparatus 17. For example, the device 19 which is provided with a sensing element 24 may control the apparatus 17 to maintain the temperature of the treated product below a predetermined desirable value, this again being effected by controlling the characteristics of the pulsed energy produced in the field between electrodes 21 and 22.

The circuit of the unit 17 is indicated diagrammatically in FIG. 2. The circuit as illustrated includes a radio frequency oscillator 25 the output of which is connected to a frequency doubler 26, and the output of the doubler 26 is connected to a second doubler 27 which acts as a driver for a radio frequency power amplifier 28. The amplifier 28 is designed to have a linear output. The plate circuits of the oscillator and the doublers are connected to a power supply 29 and the plate circuits of the amplifier 28 are connected to a high voltage power supply 31.

A pulse generator 32 is connected to provide control signals or potentials for determining the output of the amplifier 28 to which it is connected through a pulse coupler 33. The pulses from the generator 32 are supplied through the coupler 33 to actuate a suitable switching or gating circuit in the amplifier for effecting intermittent operation of the amplifier 28 so that its output connected to a load coupler 34 comprises a continuous series of bursts of high frequency energy, each burst corresponding in shape and duration to the respective pulse supplied by the generator 32. This energy is applied as an electrostatic potential between the electrodes 21 and 22 as indicated at the output of the coupler 34 to produce an electrostatic field through which the material passes.

In order to control the intensity of the pulsed field between the electrodes 21 and 22 the output of the amplifier 28 is adjusted both as to amplitude and duration of the pulses of high frequency energy. In addition to this the generator 32 may be adjusted to change the duration and periodicity of the pulses. It will be understood that the total energy of the pulses supplied to the electrodes depends upon both amplitude and duration and is also dependent upon the rate or frequency of occurrence of the pulses.

The manner in which the bursts of energy are developed is further indicated in FIGS. 3 and 4. FIG. 3 is a graph illustrating four curves representing the output characteristics of the components of the apparatus of FIG. 2 shown on the same time base, the four curves being indicated at 35, 36, 37 and 38, respectively. The curve 35 represents the sine wave output of the oscillator 25 and the curve 36 the sine wave output of the doubler 26 which is at a frequency twice that of the curve 35. The output of the doubler driver 27 is shown as the curve 37 which is at twice the frequency of the curve 36, and the output of the amplifier 28 is indicated by the curve 38 which is at the same frequency as the curve 37 and includes upper half cycles which have been shown as clipped or flat-topped waves. For the purpose of effecting dielectric heating and drying of substances the apparatus may be designed so that the frequencies of the waves 35, 36 and 37 are, respectively, of the order of seven, fourteen and twenty-eight megacycles.

The characteristic curves shown in FIG. 4 represent control pulses supplied by the pulse generator 32 all at the same pulse frequency. Curve 40 illustrates a series of square wave pulses which may be considered the normal output of the generator, and curves 41 and 42 represent adjusted outputs, the curve 41 comprising a series of pulses of shorter duration than those of the curve 40 but of greater amplitude and the pulses of curve 42 being of about the same amplitude as those of the curve 40 but of longer duration. When each of these pulses is supplied to act as a gating control for the amplifier 28, the bursts of energy at the output of the amplifier and which are applied between the electrodes 21 and 22 will have an energy content proportional in magnitude to the areas of the pulses in the respective curves 40, 41 and 42.

In addition to the square wave pulses illustrated, the generator 32 may be designed to include a sawtooth wave generator to provide a pulsed wave form such as represented by the curves 43 and 44 thereby providing a different characteristic shape or configuration of the pulses supplied for controlling the amplifier 28; furthermore, the pulse generator may be controlled to change the frequency or occurrence rate of the pulses as indicated, by way of example, by the curve 45 wherein the pulses occur at shorter intervals than in the curves 40, 41 and 42.

The above indicated adjustments of the wave shape and energy of the pulses make it possible to control accurately the output of the apparatus and to effect accurate control of the treatment of the material passing along the conveyor belt 10. The total energy of the selected pulses in any one period is represented by the summation of the areas of the pulses for that period and it is thus apparent that a high intensity of treatment may be effected while providing intermittent pulses and thereby preventing undesired effects such as overheating of the material being treated. By making possible a very substantial reduction in power by virtue of the pulsed output, together with the advantage of effective control, very substantial economies in the operation of the material treating equipment may be realized, together with more precise control of the final product.

The design requirements for the circuitry indicated by the blocks in FIG. 2 in order to perform the required functions will readily be apparent to those skilled in the art, and a detailed description of the internal circuits of the several components is not necessary to an understanding of applicant's invention. However, by way of illustration and not of limitation, there is shown in FIG. 5 a schematic circuit diagram indicating the connections of components suitable for use in the system disclosed in FIG. 2. In this figure the block components of FIG. 2 have been indicated by dotted outlines and the same numerals have been applied.

The oscillator 25 shown in FIG. 2 is a crystal stabilized oscillator having a crystal 46 connected between the grids or control electrodes of two three-electrode electron discharge tubes or devices 47 and 48. The plates of the tubes are connected in push-pull relationship to a tuned tank circuit 50. The anode or plate supply for the tubes 47 and 48 is provided from the low voltage power supply 29 through a lead 51 coupled to the tank circuit 50 through an inductance or choke coil 52 and a bypass capacitor 53.

The inductance of the tank circuit 50 is the primary winding of a transformer 54 having a center-tapped secondary winding 55 connected to supply the grids of two electron discharge devices 56 and 57 of the doubler 26, the tubes 56 and 57 being connected in a push-push relationship to a tuned tank circuit 58. The anode voltage for the tubes 56 and 57 is supplied from the power supply 29 through a lead 60 connected to the tank circuit through a choke 61 bypassed for radio frequencies by capacitor 62.

The inductance of the tank circuit 58 is the primary winding of the transformer 63 having a center-tapped secondary 64 connected to the grids of two electron discharge devices 65 and 66 having their anodes or plates connected in push-push relationship to a tuned tank circuit 67. The plate circuit of the doubler 27 is supplied through a lead 68 from the power supply 29 connected to the tank circuit 67 through a choke 70 bypassed by capacitor 71.

The inductance of the tank circuit 67 is the primary winding of a transformer 72 having a center-tapped secondary 73 which is the input of the power amplifier 28 and is connected to supply the grids of electron discharge tubes 74, 75, 76 and 77 connected in push-pull relationship; the tubes 74 and 75 are connected in parallel as a pair and the tubes 76 and 77 are similarly connected as a pair. The pairs of tubes are connected in push-pull to supply a tank circuit 78 including a center-tapped inductance 79 which is the primary winding of an output transformer 81. The power supply for the anode circuit of the power amplifier is supplied through a lead 82 from the high voltage supply 31, the lead 82 being connected to the center tap of the winding 79 through a choke coil 83 bypassed by capacitor 84. A milliammeter 85 is connected in the circuit of the lead 82 to provide an indication of the output current of the amplifier.

The amplifier 28 is coupled to the load electrodes 21 and 22 by the coupler 34 which comprises the secondary winding of the transformer 81 indicated at 86, and a variable capacitor 87 connected across the coil to facilitate the matching of the ouput to the load.

In order to control the output of the amplifier 28 the grids of the pairs of tubes 74, 75 and 76, 77 are connected through choke coils 88 and 89, respectively, by a conductor 91 to a negative bias supply in the low voltage supply unit 29 so that the grids of the power amplifier tubes are biased below cutoff. The control voltage for rendering the amplifier operative is supplied through the pulse coupler 33 which comprises a three-electrode electron discharge device or triode 95 connected as a cathode follower, the cathode resistance indicated at 96 being coupled to the lead 91 through a capacitor 97.

Plate voltage for the anode of the tube 95 is supplied from the low voltage supply 29. Control signals are supplied to the tube 95 through a single-pole double-throw switch 98 which in its upper position connects the grid of the tube 95 to the output of a multivibrator 99 and in its lower position connects the grid to the output of a sawtooth wave generator 100. The multivibrator 99 includes two three-electrode electron discharge devices 101 and 102 and, in order to afford adjustment of the pulse duration and amplitude, variable capacitors 104 and 105 and variable resistances 106 and 107 are included in the circuit; the resistances 106 and 107 are the anode and grid resistances, respectively, for the tube 102. The output of the multivibrator is a square wave as indicated by the curve 108 adjacent the output coupling capacitor indicated at 109. The multivibrator 99 is also employed to time the sawtooth oscillator 100.

The oscillator 100 as indicated includes a triode or three-electron discharge device 111 having a variable anode resistance 112 and a variable capacitor 113 connected across the tube 111. The output of the oscillator is coupled to the lower stationary contact of the switch 98 through a capacitor 114. Adjustment of the capacitor 113 varies the slope of the sawtooth wave and adjustment of the resistor 112 the amplitude of the wave. The output of the multivibrator 99 is coupled to the control electrode of the tube 111 through a capacitor 115 which thus establishes the periodicity of the oscillator 100. It is thus apparent that the periodicity and wave shape of the control signals may be varied by adjustment of the controls of the signal generator 32.

A system for producing intermittent bursts of high frequency energy as shown in FIG. 5 may be employed for producing electromagnetic fields as well as electrostatic fields and thus the total power required for induction heating operations in some applications may be substantially reduced by employing the pulse system shown. For this purpose there has been illustrated a single-pole double-throw switch 116 which connects the electrode 21 in the system in its lower position and which in its upper position connects an induction coil 117 to the output of the transformer 81 through a variable capacitor 118. The magnetic field produced by the coil 117 may then be employed to produce periodic bursts of high frequency energy for induction heating.

For some applications of the system of this invention it may be desirable to treat material by the action of fields of energy along different and transverse axes, and by way of example there is illustrated in FIG. 3 a system wherein two high frequency energy generators 120 and 121 are provided to produce fields, respectively, between a pair of electrodes 122 and 123 and a pair of electrodes 124 and 125. The generators 120 and 121 are of the same general construction and operation as the generator illustrated in FIG. 2. The function of the pulse generators and doublers 25, 26 and 27 of FIG. 2 are performed by generators 126 and 127, respectively, of the units 120 and 121 and the signal or control pulses are produced, respectively, by pulse generators 128 and 129. The outputs of the generators 128 and 129 are fed to power amplifiers 132 and 133 through pulse couplers 134 and 135, respectively. The outputs of the generators 132 and 133 are applied to the electrodes 122 and 124, respectively, and produce electrostatic fields at substantially right angles to each other. In addition to the fields produced the output of the generators may be pulsed at different frequencies and adjusted for different magnitude or intensity and duration so that a wide variety of different fields may be applied to a substance within the zone defined by the electrodes.

For some applications it may be desirable that the treatment of material be effected by inductive heating along one axis and electrostatic heating along another, the inductive energy being applied at a relatively low frequency. Thus the inductive energy might be employed to heat a metal under treatment and the dielectric energy applied at another angle for polarizing or annealing purposes.

FIG. 7 illustrates a further application of the method and system of this invention and illustrates four radio frequency energy generating units 138, 139, 140 and 141, each of these units being the full equivalent of the single unit illustrated in FIG. 2 and producing bursts of energy which are represented in time sequence along the output lines of the four units indicated at 143, 144, 145 and 146. The bursts of energy produced by each of the units are represented by characteristic curves, the unit 138 producing a steady burst 146 at the initiation of a selected period while the unit 141 produces the first pulse 147 of a series of pulses of square wave energy occurring at a periodicity of the same duration as a single one of the pulses 146. The generator 139 produces a plurality of pulses 148 after the termination of the pulse 146 and the second of the pulses 147, which series of pulses are terminated before the third pulse of pulse 147. The pulses 146, 147 and 148 are all square pulses.

The generator 140 produces a series of non-linear pulses 151 which begin at the end of the pulse 146 and the beginning of the second pulse 147 and are terminated at the initiation of the third pulse 147. The leads 143, 144, 145 and 146 are connected, respectively, to electrodes 152, 153, 154 and 155, the electrodes 153 and 155 producing a field along one axis and electrodes 152 and 154 along an axis or plane at right angles thereto.

It will now be apparent that material within the load zone of the apparatus shown in FIG. 7 may be treated by the application of a wide range of energy pulses along different axes. In order to synchronize the pulses in any desired manner, and as illustrated for example by the occurrence of the pulses described above, the generators 138, 139, 140 and 141 are controlled by synchronizing pulses applied to the generators at their inputs and as indicated by square wave pulses 158, 159, 160 and 161 at the respective inputs of the generators. These synchronizing pulses may be produced by any suitable synchronizing pulse generator in a manner well known in the art.

The system of FIG. 7 may be employed to modify the action of chemical processes. For example, the energy from the generator 138 may be employed to produce a predetermined required temperature for a chemical reaction or treatment and the generator 140 may then apply high frequency energy modulated by a sine wave voltage of lower frequency and facilitate the maintaining of the heat level within the load and stabilize the attitudes of molecular particles by energizing them in a repetitive oscillatory state and thus will establish definable attitudes of the molecules in the material.

The energy from unit 139 may be applied simultaneously or sequentially with relation to the energy from unit 140 to motivate the electrons in a different plane and facilitate the interlocking of the electron orbits of the various atoms present. In this connection the interlock must be achieved to whatever extent each atom is affected by the energy applied and the application of the energy must be timed and directed so as to effect collision paths. The treatment of the atoms and molecules of the structure in this manner gives an increased latitude in planning and controlling chemical reactions and facilitates the completion of the chemical processes more reliably and in a shorter time. The pulses produced by the unit 141, as illustrated, are intended for measurement purposes only and are of small amplitude so that they do not affect the actions produced by the other units.

It will be understood that the application of pulsed high frequency energy to a material under treatment may be effected along any number of axes, additional power generating units being employed and synchronized to produce bursts of energy affecting the material in a desired sequence with respect to the other units. The number of directions of field and sequences of application of bursts of energy to the material are determined by the particular process being employed. It will be obvious that by adjusting the various factors in the outputs of the plurality of generators a very wide range of sequences of treatment may be secured. The total power required for this treatment may be substantially reduced by employing the pulsed energy arrangement described.

While the invention has been described in connection with specific forms of apparatus, various other applications and manners of treatment may occur to those skilled in the art. Therefore, it is not desired that the invention be limited to the details illustrated and described and it is intended by the appended claims to cover all modifications which fall within the spirit and scope of the invention.

I claim:

1. The method of heating and drying a substance which comprises producing a continuous series of spaced bursts of high frequency energy, utilizing the spaced bursts of energy for producing an intermittent field of energy, subjecting the substance to the field for effecting high frequency heating thereof during each of said bursts of energy, continuously sensing the moisture content of the substance, and continuously adjusting the energy content of the individual bursts of energy in direct proportion to the moisture content of the substance.

2. The method of treating a substance which comprises generating a plurality of separate series of spaced bursts of high frequency energy, utilizing the energy in each of said series for producing respective fields of pulsed energy, subjecting the substance to said fields of energy for effecting treatment by high frequency energy during each of said bursts of energy, and independently adjusting the relative timing and duration of the bursts of energy in each of said fields to control the effective energy of the fields during treatment.

3. The method of claim 2 wherein each of said fields of energy is directed across said substance along a different axis.

4. The method of claim 2 wherein the frequency of the energy of each of said series of bursts is different.

5. The method of treating a substance which comprises generating a plurality of series of spaced bursts of high frequency energy, utilizing the energy in each of said series for producing respective fields of pulsed energy, subjecting the substance to said fields of energy for effecting treatment by high frequency energy during each of said bursts of energy, adjusting the relative timing and duration of the bursts of energy in said fields to control the effective energy of the fields during treatment, and including the step of pulsing each of said series of bursts at a different frequency and adjusting the relative magnitude of said bursts of energy in said fields.

6. The method of treating a substance by utilization of high frequency energy which comprises generating a plurality of separate series of spaced bursts of high frequency energy, utilizing the energy for producing a plurality of fields of pulsed energy, and subjecting the substance to said fields in succession.

7. The method of claim 6 including the step of adjusting the relative intensities and durations of the pulses of energy in said fields.

8. The method of treating a substance by utilization of high frequency energy which comprises generating a first series of spaced bursts of high frequency energy, generating a second series of spaced bursts of high frequency energy, utilizing the energy of said first series for producing a field of pulsed energy along a first axis, utilizing the energy of said second series of spaced bursts for producing a field of pulsed energy along a second axis transverse to said first axis, subjecting the substance to be treated to both said fields, and controlling the timing of the pulses in said first and second series to effect alternate production of energy pulses along said first and second axes.

9. The method of treating a substance which comprises generating a first and a second series of spaced bursts of high frequency energy the frequency of the energy of said second series being relatively low as compared with that of the first, utilizing the energy of said first series of bursts for producing an electrostatic field of pulsed energy, utilizing the energy of said second of said series of spaced bursts for producing an electromagnetic field, and subjecting the substance to be treated to both said fields for effecting treatment during each of said bursts of energy.

10. An apparatus for the high frequency treatment of materials comprising means for generating a first series of bursts of high frequency energy, means for producing a second series of bursts of high frequency energy, means for adjusting the duration and intensity of the bursts of energy in both said series of bursts, means utilizing said first and second series of bursts for producing first and second respective energy fields along axes transverse to one another, and means for subjecting the material to be treated to both said fields.

11. The apparatus of claim 10 including means for controlling the operation of said two generating means to produce said fields in time sequence.

12. The apparatus of claim 10 including means for adjusting the duration and intensity of the respective bursts in said first and second series of bursts.

References Cited

UNITED STATES PATENTS

| | | |
|---|---|---|
| 2,676,416 | 4/1954 | Calosi et al. _____ 34—1 |
| 2,740,756 | 4/1956 | Thomas _____ 34—1 |
| 3,095,359 | 6/1963 | Heller _____ 204—158 |

FOREIGN PATENTS

| | | |
|---|---|---|
| 1,369,553 | 7/1964 | France. |

FREDERICK L. MATTESON, JR., *Primary Examiner.*

JOHN J. CAMBY, *Assistant Examiner.*